United States Patent [19]
Janikowski

[11] Patent Number: 6,150,580
[45] Date of Patent: *Nov. 21, 2000

[54] METHOD FOR DESTROYING HAZARDOUS ORGANICS AND OTHER COMBUSTIBLE MATERIALS IN A SUBCRITICAL/SUPERCRITICAL REACTOR

[75] Inventor: Stuart K. Janikowski, Idaho Falls, Id.

[73] Assignee: The United States of America as represented by the United States Department of Energy, Washington, D.C.

[ * ] Notice: This patent issued on a continued prosecution application filed under 37 CFR 1.53(d), and is subject to the twenty year patent term provisions of 35 U.S.C. 154(a)(2).

[21] Appl. No.: 08/969,613

[22] Filed: Nov. 13, 1997

[51] Int. Cl.$^7$ ..................................................... A62D 3/00
[52] U.S. Cl. ......................... 588/205; 588/208; 588/209; 588/213
[58] Field of Search .................................... 588/208, 209, 588/213, 205; 110/126, 431, 432, 346, 229, 237; 241/600; 414/147; 422/242; 210/761

[56] References Cited

U.S. PATENT DOCUMENTS

| | | | |
|---|---|---|---|
| 3,959,974 | 6/1976 | Thomas | 60/712 |
| 4,108,113 | 8/1978 | Timm et al. | 123/3 |
| 4,154,811 | 5/1979 | Vona, Jr. et al. | 423/481 |
| 4,301,014 | 11/1981 | Buckholtz et al. | 210/721 |
| 4,338,199 | 7/1982 | Modell | 210/721 |
| 4,805,571 | 2/1989 | Humphrey | 123/316 |
| 5,384,051 | 1/1995 | McGinness | 210/761 |
| 5,551,472 | 9/1996 | McBrayer, Jr. et al. | 137/114 |
| 5,558,783 | 9/1996 | McGuinness | 210/761 |
| 5,591,415 | 1/1997 | Dassel et al. | 422/241 |
| 5,602,298 | 2/1997 | Levin | 588/227 |
| 5,690,898 | 11/1997 | Barnes et al. | 423/210 |

OTHER PUBLICATIONS

National Academy Press, Alternative Technologies for the Destruction of Chemical Agents and Munitions, p 146–152, 1993.

*Primary Examiner*—Steven P. Griffin
*Assistant Examiner*—Eileen E. Nave
*Attorney, Agent, or Firm*—Daniel D. Park; Mark F. LaMarre; William R. Moser

[57] ABSTRACT

A waste destruction method using a reactor vessel to combust and destroy organic and combustible waste, including the steps of introducing a supply of waste into the reactor vessel, introducing a supply of an oxidant into the reactor vessel to mix with the waste forming a waste and oxidant mixture, introducing a supply of water into the reactor vessel to mix with the waste and oxidant mixture forming a waste, water and oxidant mixture, reciprocatingly compressing the waste, water and oxidant mixture forming a compressed mixture, igniting the compressed mixture forming a exhaust gas, and venting the exhaust gas into the surrounding atmosphere.

7 Claims, 1 Drawing Sheet

METHOD FOR DESTROYING HAZARDOUS ORGANICS AND OTHER COMBUSTIBLE MATERIALS IN A SUBCRITICAL/SUPERCRITICAL REACTOR

CONTRACTUAL ORIGIN OF THE INVENTION

The United States Government has rights in this invention pursuant to Contract No. DE-AC07-76ID01570 between the United States Department of Energy and Idaho National Environmental and Engineering Laboratory, as represented by EG&G Idaho, Inc.

BACKGROUND OF THE INVENTION

This invention relates generally to controlled chemical oxidation or combustion of hazardous organics and other combustible waste materials. More particularly, the present invention pertains to a method and an apparatus for improving combustion of waste materials using a wet oxidation reactor in combination with various fuels and oxidants which facilitate and enhance the combustion of such waste materials.

Still further the present invention is directed to the incineration or combustion of combustible waste, such as hazardous wastes, industrial wastes, mixed hazardous radioactive wastes or radioactive wastes, which may comprise fine particulates, gaseous materials, organic solids and liquids ranging from low boiling materials to gummy organics with suspended solids. Such waste materials can include paint, paint stripping wastes, coatings, and spent cleaning solvents; liquid organic wastes from chemical plants or other chemical processing operations, such as hazardous waste chemicals, solvents, liquid polymers and polymer solutions, dispersions, emulsions, and chemical reaction byproducts; oil and sludges from petroleum refining operations, such as waste petroleum products, residues from distillation columns, and unrefined byproducts; from manufacturing operations, such as spent solvents and lubricants; from food processing operations, such as spent cooking oils and processing oils; from printing operations, such as inks and cleaning solvents; and the like. Accordingly, as used herein, a waste material may comprise all of these materials, alone or in combination, provided that it is in a form which is able to be combusted in a wet oxidation reactor. In the case of dry solid wastes it is understood that the addition of suitable solvents and the like would be required to enable such material to be in a liquid form or slurry when introduced into a reaction chamber in a reactor.

A 1995 study of Toxic Release inventory conducted by the U.S. Environmental Protection Agency (EPA) concluded that while the amount of toxic waste released into the environment is declining, the amount of toxic waste generated is increasing. In fact, the EPA has determined that industrial facilities generated 3% more toxic waste in 1995 than in 1994 and 7% more when compared to waste generated in 1991. In 1995, 2.2 billion pounds of waste were reported released into the air, water and land. While releases into air declined by about 7% from 1994 to 1995, discharges to water declined by about 10% and releases to land declined about 46% since 1988, releases into deep wells jumped by almost 20%. The EPA maintains that its Toxic Release inventory underscores the continuing need for pollution prevention and safe disposal of waste materials.

The need to safely dispose of waste materials, especially toxic and carcinogenic by-products of manufacturing and research processes, has commanded substantial public and government attention in the past two decades. Federal and state governments have responded to public pressure by adopting various statutes and regulations requiring that waste materials be managed and disposed properly with minimal risk to the public and the environment. Probably the most comprehensive and detailed plan for requiring safe management and disposal of hazardous waste is the federal Resource Conservation and Recovery Act of 1976 ("RCRA") as amended, and the regulations promulgated thereunder.

Despite continued efforts to accomplish safe waste disposal, a critical need remains for a means of disposing of waste. Many existing modes of waste disposal, i.e. landfills and surface impoundments, simply move hazardous substances from a high risk biosphere to a low risk biosphere. Many common disposal methods thus focus on isolating hazardous waste, rather than eliminating it. Alternatively, hazardous waste can be treated in an effort to eliminate or neutralize its hazardous characteristics. Treatments may be chemical or biochemical in nature, as in microbial biodegradation.

One solution to the problems inherent in waste disposal is to burn the waste with fuel using accelerated oxidation in specially devised reactors. Supercritical oxidation reactors use oxidizer mixtures, typically including water, at supercritical conditions to initiate a redox reaction with a fuel. Supercritical water is used in the oxidizer mix as the supercritical state of the mix accelerates the reaction and boosts reaction efficiency, thus minimizing unreacted (and therefore still harmful) exhaust.

In a water liquid/vapor phase diagram, there is a critical point of temperature (about 720° F.) and a critical point of pressure (about 3,200 psia) above which there is only one single fluid phase. Although neither liquid nor vapor, this single fluid phase seems to have more of a vapor character than a liquid one. The single-phase condition occurring above the critical points is called supercritical condition.

It is worth noting that organic matter decomposes readily under supercritical conditions, and in the presence of oxygen, carbonaceous compounds oxidize completely to carbon dioxide, sulfur compounds mostly to $SO_3$ and nitrogen compounds decompose mostly to molecular nitrogen. It is further worth noting that under supercritical water oxidation conditions, only small amounts of nitrogen oxide are produced, if any, in contrast with incineration which favors the production of nitrogen oxides.

However, as with the development of any new process or equipment, there are numerous limitations which have not been resolved, and which impair successful use and commercial exploitation. The use of extremely high pressures at elevated temperatures presents a serious problem in the construction of reactors. It is well known that as the temperature increases, the strength of materials decreases drastically. Supercritical pressures (greater than about 3,200 psia) at temperatures exceeding about 1,000° F. present an enormous challenge to any construction material. In addition to the temperature/pressure challenge, a harsh environment exists inside the reactor. Moreover, these processes generate free radicals that are difficult if not impossible to control. Such free radicals can cause the metal in such specially constructed vessels to degenerate or become completely destroyed.

Thus there exists a need to improve the method and system for combusting and destroying combustible waste. There is a further need to improve the combustion of waste materials to reduce or eliminate the free radicals generated during such combustion.

Accordingly, a first objective of the present invention is to provide an improved waste destruction system for combusting and destroying organic and combustible wastes.

A further objective is to provide an improved waste destruction method and system wherein the organic and combustible waste is combusted and destroyed in an environment that may be less than, equal to, or greater than critical conditions, i.e., subcritical, critical or supercritical.

Another objective is to provide an improved waste destruction method and system wherein the amount of free radicals produced during the combustion and destruction of the organic and combustible waste is significantly reduced or even eliminated entirely.

Yet a further objective is to provide an improved waste destruction method and system wherein the corrosion inside the reaction chamber is significantly reduced or eliminated.

SUMMARY OF THE INVENTION

Briefly, in its broadest embodiment, the present invention is directed to a method and system using a wet oxidation reactor vessel to combust and destroy organic and combustible wastes. One feature of the present invention is a compressing member that is configured for reciprocal linear movement, where the movement of the compressing member forms a compressed mixture that can be ignited and oxidized (burned) at less then, equal to or greater than supercritical temperatures and pressures of the waste.

More specifically, the present invention includes a reactor vessel with a compressing member. The reactor vessel has a housing that defines an internal reaction chamber that is configured to receive the compressing member. The compressing member compresses a waste, water and oxidant mixture (and fuel if required) forming a compressed mixture in the chamber. The compressed mixture is ignited, combusting the waste contained therein forming an exhaust gas. Finally, the exhaust gas is vented into the surrounding atmosphere.

It is obvious that other embodiments of the above-discussed method for destroying organic and combustible wastes are contemplated. It is preferred that the exhaust gas is recycled to the reactor vessel for heat recovery so that combustion and destruction of the waste is complete. It is further contemplated that any particulates in the exhaust gas are filtered out by a particulate filter and any gaseous organic or inorganic effluents are destroyed by a catalytic scrubber prior to recycling the exhaust gas back to the reactor vessel. Preferably included is a microprocessor controller for operationally governing a waste introduction means, an oxidant introduction means, a water introduction means, a compressing means, an igniting means and a venting means, where the controller includes at least one sensor.

In another embodiment, the present invention is directed to a method for combusting and destroying organic and combustible waste including introducing the waste into a wet oxidation reactor vessel; introducing an oxidant into the reactor vessel to mix with the waste, forming a waste and oxidant mixture; introducing water into the reactor vessel to mix with the waste and oxidant mixture, forming a waste, water and oxidant mixture; reciprocatingly compressing the waste, water and oxidant mixture, forming a compressed mixture; igniting the compressed mixture forming an exhaust gas; and venting the exhaust gas into a surrounding atmosphere. Additionally, this method can include introducing a fuel into the reactor vessel to mix with the waste, water and oxidant mixture prior to compressing, thereby facilitating the combustion and destruction of the waste and completing the destruction process.

The present invention significantly reduces or eliminates corrosion inside the reactor. The effect of the fuel and other organics introduced into the reaction chamber, before combustion, is to react with and chemically reduce the metal oxides and other salts on the surface of the reaction chamber or making up a part of the surface layers of the reaction chamber due to corrosive reactions from previous cycles. Corrosion is a reversible process under certain conditions, wherein the corrosion has not penetrated deeply into the reaction chamber surfaces, causing loss of the structural integrity. Advantageously, the reduction reactions between fuel and reaction chamber surfaces, during the non-oxidizing/noncombustion phases of the cycle, continually prevent corrosion and reverse its effects. The operation of this invention inherently uses a portion of the cycle for anti-corrosion reactions that maintain a reaction chamber virtually free from corrosion.

BRIEF DESCRIPTION OF THE DRAWINGS

The FIGURE is a schematic illustration of the present waste destruction system.

DETAILED DESCRIPTION OF THE PREFERRED EMBODIMENT

Figure 1:
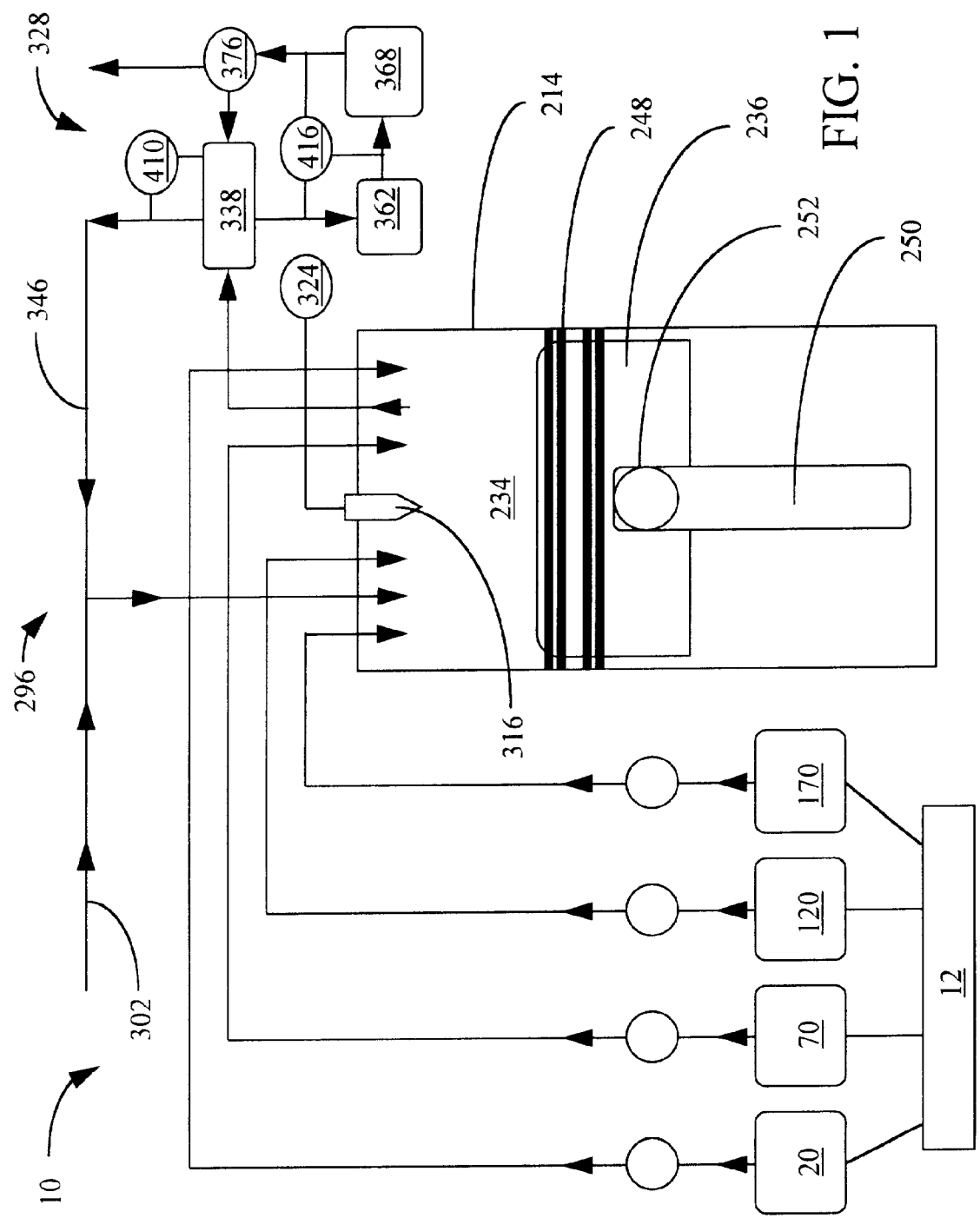

Referring now to the FIGURE, a waste destruction system, generally designated 10, is shown controlled and operationally governed by a microprocessor controller 12. The controller 12 accepts various inputs from different elements of the waste destruction system 10 and in turn makes adjustments to the elements based on those inputs.

The controller 12 is shown electrically connected to a fuel injection sensor (not shown) which engages the fuel injection system. The fuel injection system includes a fuel container 20 having a fuel chamber for containing fuel. Preferably, a fuel pump (not shown) is in fluid communication with the fuel container 20. Delivery of the fuel through the fuel injection system is accomplished by a fuel meter (not shown) acting in concert with the fuel pump and controller 12, whereby the fuel pump draws up the fuel in response to a fuel demand from the controller 12. The fuel injection system also preferably includes a fuel injector (not shown) for injecting fuel into the reaction chamber 234 of the reactor vessel 214. The rate of delivery of the fuel drawn up by the fuel pump and delivered to the fuel injector is controlled by the fuel meter connected to the controller 12.

The fuel is a material used to produce heat and/or power by burning, that is, by exothermic reaction with oxygen, such as from air. The fuel may contain additives that help control corrosion, the rate of combustion, aid in lubrication, or otherwise contribute to the desired operation of the subject invention. An important factor in combustion is the ratio of oxygen to fuel. Normal combustion processes operate with an excess of oxidizer (oxygen) relative to the stoichiometric amount required to completely combust the fuel. The subject invention is not limited by requiring a stoichiometric mixture but can also operate in lean-burn or rich-burn mixtures to accommodate different input waste streams and control exhaust emissions. The present waste destruction system 10 can operate over virtually any compression ratic. It is estimated that reactions occurring at a compression ratio less than 24:1 will be in the subcritical regime and those reactions occurring at a compression ratio greater than approximately 24:1 will be in the supercritical regime. The type of input waste stream and desired control over the reaction products determine the most desirable compression ratio.

The waste destruction system 10 accommodates a number of fuels, and specifically, propane, natural gas, gasoline, diesel fuel and alcohol, among others, depending on the application. The fuel is intended to supplement combustion in applications where the waste destruction system 10 can not support a self sustaining operation, however, applications may exist wherein fuel is not required. If required, the fuel may be introduced into the waste destruction system 10 using the fuel injector as provided above, introduced through a gaseous oxidant intake (discussed in detail below), preheated or mixed with other elements.

The controller 12 is electrically connected to a water injection sensor (not shown), which engages a water injection system, similar to the fuel injection system. The water injection system includes a water container 70 having a water chamber for containing water. Preferably a water pump (not shown) is in fluid communication with the water container 70. Delivery of the water through the water injection system is accomplished by a water meter (not shown) acting in concert with the water pump and the controller 12, where the water pump draws up the water in response to a water demand from the controller 12. The water injection system includes a water injector (not shown) for injecting water into the reaction chamber 234 of the reactor vessel 214. The water is drawn up by the water pump and delivered to the injector, wherein the rate of delivery of the water, if any, is controlled by the water meter connected to the controller 12.

In the preferred embodiment, the water is intended to facilitate controlled oxidation and destruction of the fuel and waste by moderating any free radical reactions, generating reactive species during the reaction, and contributing to the reactor pressure. However, applications may exist wherein the water may not be required. If required, the water may be introduced into the waste destruction system 10 using the water injector as provided above, or a gaseous oxidant intake (discussed in detail below), and may be preheated or mixed with the fuel 32 or with other introductants.

Similar to the fuel and water injection systems, the controller 12 is also electrically connected to an oxidant injection sensor (not shown). The oxidant injection sensor engages an oxidant injection system including an oxidant container 120 having an oxidant chamber for containing oxidant. Preferably, an oxidant pump (not shown) is in fluid communication with the oxidant container 120. It is contemplated that the oxidant could be selected from a number of common oxidants, including oxygen, nitrous oxide, peroxides, peroxyacids, among others, depending upon the application. Moreover, the oxidant is not limited to any one form, that is liquid, gaseous or solid oxidants are contemplated, again depending upon the application.

Delivery of the oxidant through the oxidant injection system is accomplished by an oxidant meter (not shown) acting in concert with the oxidant pump and the controller 12, whereby the oxidant pump draws up the oxidant in response to an oxidant demand from the controller 12. The oxidant injection system includes an oxidant injector (not shown) for injecting oxidant into the reaction chamber 234 of the reactor vessel 214. The rate of delivery of the oxidant, if any, is controlled by the oxidant meter connected to the controller 12. Again, an embodiment is contemplated in which the oxidant is not required. If required however, the oxidant may be introduced into the waste destruction system 10 using the oxidant injector as provided above, introduced through a gaseous oxidant intake (discussed in detail below), preheated or mixed with the fuel, water or with other introductants.

The controller 12 is electrically connected to a waste injection sensor (not shown) that engages a combustible waste injection system, similar to the fuel, water, and oxidant injection systems, which includes a waste container 170 having a waste chamber for containing waste. A waste pump (not shown) is preferably in fluid communication with the waste container 170.

Any combustible waste may be combusted and destroyed by the present waste destruction system, including paint, paint stripping wastes, solvents, oils, sludges, insecticides, pesticides, PCBs, halogenated organics, nonhalogenated organics, macerated wood, paper, cloth, plastic, resins, even mixed hazardous/radioactive wastes are suitable and contemplated. Moreover, the waste destruction system 10 is not limited to any one form of combustible waste (e.g., fine particulates, slurries, liquid or gaseous materials).

Delivery of the combustible waste through the combustible waste injection system is accomplished by a waste meter acting in concert with the waste pump and the controller 12, where the waste pump draws up the combustible waste in response to a waste demand from the controller 12. The waste injection system includes a waste injector (not shown) for injecting waste into the reaction chamber 234 of the reactor vessel 214. The rate of delivery of the combustible waste is controlled by the waste meter connected to the controller 12. Other methods for introducing the combustible waste are contemplated. The combustible waste may be introduced into the waste destruction system 10 using the waste injector as provided above, introduced through a gaseous oxidant intake (discussed in detail below), preheated or mixed with the fuel, the water or the oxidant.

A reactor vessel 214 includes a generally cylindrical reaction chamber 234, which is configured to receive the fuel, water, oxidant, and combustible waste, or a combination thereof. A compressing member 236 is designed for linear reciprocating movement within the reaction chamber 234. Preferably, the compressing member 236 has a generally inverted cup-like shape. Specifically, the compressing member 236 is preferably a piston, however other embodiments, including hydraulic or pneumatic rams, are all contemplated depending on the application. O-rings or split O-rings 248 are provided to move with the compressing member 236 and to form a seal between the compressing member 236 and the inner surface of the reaction chamber 234, such that the combustible waste and other matter, i.e., reactants and products, cannot escape the reaction chamber 234, other than by desired intake and exhaust paths. Preferably, the reactor vessel 214 includes an oil assembly (not shown) for introducing oil into the system, thereby providing lubrication to facilitate movement of the compressing member 236 within the reaction chamber 234.

Advancement of the compressing member 236 is controlled by an arm 250 in a crank-and-rod-like assembly which is joined to the compressing member 236 by connector 252. In the preferred embodiment, movement of the arm 250 is produced by a crankshaft or other drive mechanism (not shown), connected to, controlled and operationally governed by the controller 12. An upstroke is created when, in response to a command from the controller 12, the drive mechanism "pushes" the arm 250 upward, slidably advancing the compressing member 236, thereby compressing and decreasing the volume within the reaction chamber 234. A downstroke is created when the drive mechanism ceases to push the arm 250 upward, instead "pulling" the arm 250 downward, slidably withdrawing or retracting the compressing member 236, thereby decompressing and increasing the volume within the reaction chamber 234.

The compression ratio of the reactor vessel 214 is defined as the ratio of volume in the reaction chamber 234 when the compressing member 236 is fully advanced within the reaction chamber 234 to the volume of the reaction chamber 234 when the compression member is fully retracted. An increase in the compression ratio can result in some increase in efficiency in burning the combustible waste. It is contemplated that the reactor vessel 214 can operate at virtually any compression ratio less than approximately 24:1 to operate in the sub-critical regime, or greater than approximately 24:1 to operate in the supercritical regime.

During operation of the waste destruction system 10, the fuel injection, water injection, oxidant injection and combustible waste injection systems are all connected to the reaction chamber 234 of the reactor vessel 214. In the preferred embodiment, the combustible waste is injected into the reaction chamber 234 in a predetermined manner by the waste injector. Next the oxidant is injected into the reaction chamber 234 by the oxidant injector, mixing with the combustible waste therein forming a waste and oxidant mixture. Additionally, the water is injected into the reaction chamber 234 by the water injector combining with the waste and oxidant mixture therein forming a waste, water and oxidant mixture. Finally, the fuel (if required) is introduced into reaction chamber 234 mixing with the waste, water and oxidant mixture, forming a fuel, waste, water and oxidant mixture. The waste, water and oxidant mixture (or the fuel, waste, water and oxidant mixture if the fuel is required) is then compressed by the compressing member 236 slidably advancing within the reaction chamber 234, forming a compressed mixture within the reaction chamber 234 of the reactor vessel 214. Other methods of forming the compressed mixture are contemplated, for example, the fuel could be mixed with the combustible waste prior to injection by the waste injector, mixed with a gaseous oxidant (discussed in detail below), preheated or not used at all. Similarly, it is contemplated that the water and/or the oxidant could, alone or in combination, be mixed with the combustible waste prior to injection by the waste injector, mixed with a gaseous oxidant (discussed in detail below), preheated or not used at all. In additional embodiments, the injectable components may be pre-mixed or not and injected sequentially or simultaneously while the compressing member 236 is in any stage of the compression stroke.

The reactor vessel 214 further includes two manifolds (not shown) in fluid communication with the reaction chamber 234: an intake manifold and an exhaust manifold. Also included are an intake valve (not shown) and an exhaust valve (not shown) for controlling access between the reaction chamber 234 and the intake and exhaust manifolds, respectively.

In the embodiment illustrated in the FIGURE, the waste destruction system 10 includes more than one method for introducing the oxidant into the reactor vessel 214. A gaseous oxidant intake system, generally designated 296, introduces a gaseous oxidant into the reactor vessel 214 in a gaseous form, in addition to the oxidant injection system which introduces the oxidant in a liquid form. In the preferred embodiment, a gaseous oxidant inlet 302 is in fluid communication with a gaseous oxidant tank (not shown) or may be open to the surrounding atmosphere, depending on the oxidant utilized.

The gaseous oxidant inlet 302 is further in fluid communication with the reaction chamber 234 of the reactor vessel 214, via the intake manifold. As discussed above, fuel and/or water may be mixed with the gaseous oxidant prior to introducing the gaseous oxidant into the reactor vessel 214. In this way, introduction of the oxidant is accomplished either by delivering liquid oxidant via the oxidant injection system, whereby the oxidant pump draws the liquid oxidant in response to the controller 12 and oxidant meter 142, or by delivering gaseous oxidant via the gaseous oxidant intake system 296, whereby the gaseous oxidant is introduced into the reaction vessel 214 through the intake manifold controlled by the intake valve, or both.

Another important feature of the present invention is the introduction of water into the reactor vessel 214 to mix with the waste and oxidant mixture forming a waste, water and oxidant mixture, and to facilitate controlled oxidation and destruction of the combustible waste by moderating any free radical reactions, generating a reactive species during the reaction and contributing to the reactor vessel 214 pressure. Fuel is introduced into the reactor vessel 214, if needed, to facilitate combustion and destruction of the combustible waste to complete the destruction process.

The mixture in the reactor vessel 214 is compressed by the linear reciprocating motion of the compressing member 236 forming the compressed mixture 254 therein. Compression is performed by the compressing member 236 moving in a linear reciprocating manner in response to command from the controller 12, for example, by rotation of a crankshaft (not shown). The upstroke created by the drive mechanism "pushes" the arm 250 upward, slidably advancing the compressing member 236 into the reaction chamber 234. The timing for this action and all the mechanical operation of the subject invention, including the timing for introducing the combustible waste, the oxidant, the water, and the fuel, the linear reciprocating movement of the compressing member 236, and expelling of any waste are governed by the controller 12, or by other mechanical means governed by the controller 12, i.e., variable stroke, ignition timing, or timing of the fuel, water, oxidant and combustible waste inputs.

An important feature of the subject invention is the ignition system. The ignition system includes a glow plug 316 having an ignition end extending into the reaction chamber 234 and a second end electrically connected to an ignition control mechanism 324. The ignition control mechanism 324 is connected to the controller 12 which includes all the elements required for timing and igniting the glow plug 316 in response to a demand from the controller 12. In another embodiment, timing and ignition of the glowplug 316 can be controlled through mechanical means by coupling the motion of the compressing member 236 (via the crankshaft) to the controller 12 or to some other electrical discharge device as is known to one skilled in the art. The ignition system ignites the compressed mixture in a known manner forming an exhaust gas.

The illustrated device is further adapted to include a recycling system, generally designated 328, for recycling the exhaust gas to the reactor vessel 214 for heat recovery and to complete the combustion and destruction of the combustible waste. Preferably, the recycling system 328 is connected to the exhaust manifold of the reaction vessel 214 by a recirculatory member 338. Directional flow of the exhaust gas, which effects heat recovery and the completion of the destruction and combustion of the combustible waste, is controlled by the exhaust gas recirculatory member 338 connected to the controller 12. The recirculatory member 338 is further connected to a conduit 346 for conducting the exhaust gas to the reactor vessel 214.

In the depicted embodiment, the exhaust gas recirculatory member 338 is also connected to a particulate filter 362. The particulate filter 362 acts to filter out any particulates contained in the exhaust gas prior to recycling the exhaust gas to the reactor vessel 214 or venting the exhaust gas to the surrounding atmosphere. Preferably, the particulate filter includes at least one HEPA filter to filter out any particulates contained in the exhaust gas.

Since the exhaust gas may also include gaseous organic and/or entrained inorganic effluents, a scrubber member 368, preferably a catalytic scrubber, is provided to capture and destroy the effluents prior to recycling or venting the exhaust gas. The scrubber member 368 is in fluid communication via a conduit to the particulate filter 362. In this manner, the exhaust gas may be conducted to the scrubber member 368 to remove any gaseous organic and inorganic effluents after any particulates have been filtered out by the particulate filter 362. While the present invention has been described in connection with a particulate filter 362 and a scrubber member 368, one skilled in the art will appreciate that the invention is not so limited and other means are contemplated for filtering out any particulates and capturing and destroying and gaseous organic and inorganic effluents, including placing the scrubber member 368 in front of the particulate filter 362, using noncatalytic technologies, etc.

The depicted recycling system 328 includes a recirculatory valve 376 in fluid communication with the scrubber member 368, whereby the exhaust gas vented by the scrubber member 368 may be recycled to the reactor vessel 214 or vented to the surrounding atmosphere. Additionally, the recycling system 328 includes a conduit connecting the recirculatory valve 376 and the exhaust gas recirculatory member 338, whereby the exhaust gas vented by the scrubber member 368 can be recycled to the exhaust gas recirculatory member 338 or vented to the surrounding atmosphere.

As shown in the FIGURE, the recycling system 328 includes at least one, but preferably two, sensors 410, 416 that monitor the flow of the exhaust gas, particulates, effluents and any combustible waste contained therein. In this manner, the exhaust gas is monitored by the controller 12, in combination with the exhaust gas recirculatory member 338 and the recirculatory sensors 410 and 416, to determine whether the exhaust gas should be recycled to the reactor vessel 214 for further combustion, transmitted to the particulate filter 362 and scrubber member 368 or vented to the surrounding atmosphere.

During operation of the waste destruction system 10, the fuel, water, oxidant, and combustible waste injections systems are initiated, and, preferably, a water, oxidant, combustible waste mixture is formed, although fuel may be present if required for combusting the waste. The mixture in the reactor vessel 214 is reciprocatingly compressed forming the compressed mixture therein. Reciprocating compression is performed by the compressing member 236 moving in a linear reciprocating manner, e.g., part as of a four-stroke or a two-stroke cycle.

A four-stroke cycle includes: an intake stroke, a compression stroke, a power stroke, and an exhaust stroke. At the start of the intake stroke, the compressing member 236 is fully advanced within the reaction chamber 234, and the intake valve and the exhaust valve are closed. During the intake stroke, the compressing member 236 is slidably retracted, such that the volume of the reaction chamber 234 is increased. At or about the same time, the intake valve begins to open. The sliding motion of the compressing member 236 creates a reduced pressure inside the reaction chamber 234 (relative to the external environment), and in conjunction with the open intake valve, allows movement of the gaseous oxidant into the reaction chamber 234. At or before the time the compressing member 236 is fully retracted, the intake valve closes.

The compression stroke begins with the subsequent movement of the compressing member 236 from its fully retracted position to a fully advanced position within the reaction chamber 234, with both the intake and exhaust valves closed, compressing the contents inside the reaction chamber 234. At or about the completion of the compression stroke, any and all of the fuel, water, oxidant and combustible waste are introduced into the reaction chamber 234 forming the compressed mixture, and ignited by the compression and the glowplug 316, causing the compressed mixture to burn rapidly, producing the hot exhaust gas. The timing for initiating combustion of the compressed mixture may vary and will have an effect on the completeness of combustion.

The power stroke begins as the compressing member 236 is retracted, whereby the combustion gas expands and pushes against the compressing member 236.

The exhaust stroke begins subsequent to the power stroke as the compressing member 236 is advanced into the reaction chamber 234. The exhaust valve opens to allow the combustion gas to be expelled from the reaction chamber 234 by forces exerted on the exhaust gas by the movement of the compressing member 236. As the compressing member 236 is fully advanced, the exhaust valve closes and the four strokes are complete. Continuous operation is achieved upon completion of the exhaust stroke by immediately beginning another cycle starting with the intake stroke.

Further, the waste destruction system 10 can operate in a two-stroke cycle, that accomplishes the same functions as the four-stroke cycle. For a two-stroke cycle, the intake and exhaust valves and are absent and the intake and exhaust manifolds are relocated to a point approximately midway down the reaction vessel 214 relative to the length of stroke of the compressing member 236. The compressing member 236 is also shaped differently and now has a ridge (not shown) protruding from and bisecting an upper surface the compressing member 236, thus allowing smooth flow of the gaseous oxidant into the reaction chamber 234 from the intake manifold and smooth outflow of exhaust products through the exhaust manifold.

Operation of the two-stroke cycle begins with an intake stroke, whereby the compressing member 236 which is advanced within the reaction chamber 234 begins to retract. Reduced pressure inside the reaction chamber 234 allows the gaseous oxidant (and the fuel if necessary) to enter the reaction chamber 234 through the intake port as the compressing member 236 retracts beyond the intake port. The compressing member 236 fully retracts, reverses direction, and begins to advance within the reaction chamber 234, thereby passing the intake and exhaust ports. The compression stroke begins as the compressing member 236 passes the intake and exhaust ports. As the compressing member advances, the fuel, water, oxidant and combustible waste may be introduced into the reaction chamber 234 and ignited. The power stroke begins as the compressing member 236 retracts from within the reaction chamber 234, and the expansion of the combustion gas forces the compressing member 236 to pass the intake and exhaust ports. The pressure in the reaction chamber 234 is relieved by exhausting the combustion gas as exhaust gas through the exhaust port, functioning as the exhaust stroke. As the pressure in the reaction chamber 234 is relieved the compressing member 236 passes the intake port where the gaseous oxidant is introduced into the reaction chamber 234 and the cycles begins again.

Provision is made for the waste destruction system 10 to operate in a self sustaining mode, where the combustible waste and the fuel are utilized to sustain the reactor vessel 214 in engine-like operation, or, alternatively, in a driven mode, wherein the waste destruction system 10 is driven by an external power source, i.e. movement of the compressing member 236 is provided by an external motor driven engine, hydraulic or pneumatic ram or an externally powered rotary reactor.

The present improved waste destruction system 10 combusts and destroys the combustible waste at less than, equal to, or greater than critical temperatures and pressures depending upon its mode of operation, its physical dimensions, and the amount of fuel, water, oxidant and combustible waste injected into the system. Improved waste destruction is accomplished by using the above-described reactor vessel 214 with the compressing member 236, in combination with the compressed mixture and the glowplug 316. Further, the improved waste destruction system 10 combusts and destroys the combustible waste while reducing or eliminating the free radicals produced during such combustion and destruction by introducing water into the waste, water and oxidant mixture (or fuel, waste, water, and oxidant mixture, where fuel is required).

While a particular embodiment of the waste destruction system and method has been shown and described, it will be appreciated by those skilled in the art that changes and modifications may be made thereto without departing from the invention in its broader aspects as set forth in the following claims.

What is claimed is:

1. A method for destroying hazardous organics, comprising the steps of:
   introducing combustible waste comprising organic matter into a wet oxidation reactor having a compressive member;
   introducing an oxidant and water into the wet oxidation reactor;
   compressing the waste, water and oxidant mixture with said compressive member to form a compressed mixture;
   reacting the compressed mixture at a temperature of at least 720° F. and a pressure of greater than 3,200 psi to form reaction products, resulting in the occurrence of a process of corrosive change on inner surfaces of the wet oxidation reactor;
   decompressing the reaction products within the wet oxidation reactor;
   venting the reaction products from the wet oxidation reactor; and
   reversing the process of corrosive change occurring on the inner surfaces of the wet oxidation reactor by repeating the step of introducing combustible waste comprising organic matter into a wet oxidation reactor.

2. The method of claim 1, further comprising the step of introducing a fuel into the wet oxidation reactor subsequent to compressing the mixture.

3. A four stroke cycle method for destroying hazardous organics, comprising the steps of:
   providing a wet oxidation reactor having a reaction chamber and means for compressing and decompressing the volume of the reaction chamber;
   executing an intake stroke comprising the steps of decompressing the volume within the reaction chamber and injecting combustible waste, oxidant, and water into the reaction chamber, the combustible waste comprising organic matter, such that the presence of the organic matter reverses a process of corrosive change occurring on the reaction chamber inner surfaces;
   executing a compression stroke comprising the steps of compressing the volume of the reaction chamber and reacting the waste, oxidant and water, such that a process of corrosive change is initiated on the reaction chamber inner surfaces;
   executing a power stroke comprising the step of decompressing the volume of the reaction chamber;
   executing an exhaust stroke comprising the step of compressing the volume of the reaction chamber and venting reaction products from the reaction chamber; and
   repeating the four stroke cycle method, such that corrosion within the wet oxidation reactor is significantly reduced or eliminated by repetition of the four stroke cycle method.

4. The method according to claim 3, wherein the step of executing the compression stroke further comprises the step of maintaining the temperature of the reaction chamber at a temperature of at least about 720° F. and at a pressure of at least about 3,200 psia.

5. The method according to claim 3, wherein the step of executing the intake stroke further comprises the step of injecting fuel into the reaction chamber of the wet oxidation reactor to facilitate a complete reaction within the wet oxidation reactor.

6. A method for destroying hazardous organics, comprising the steps of:
   providing a wet oxidation reactor having a reaction chamber and means for compressing and decompressing the volume of the reaction chamber;
   executing a decompression stroke that increases the volume and reduces the pressure within the reaction chamber and comprises the steps of exhausting any reaction products from the reaction chamber and injecting combustible waste, oxidant, and water into the decompressed reaction chamber, forming a mixture therein, such that the presence of the waste comprising organic matter reverses any process of corrosive change on surfaces within the reaction chamber;
   executing a compression stroke that decreases the volume and increases the pressure within the reaction chamber and comprises the steps of reacting the mixture, thereby generating reaction products and initiating a process of corrosive change on surfaces within the reaction chamber; and
   repeating the steps of executing the decompression and compression strokes, such that corrosion within the wet oxidation reactor is significantly reduced or eliminated.

7. The method of claim 6, wherein the step of executing the compression stroke further comprises the step of maintaining the reaction chamber at a temperature of at least about 720° F. and at a pressure of at least about 3,200 psia.

* * * * *